(12) United States Patent
Ju et al.

(10) Patent No.: US 6,909,674 B2
(45) Date of Patent: Jun. 21, 2005

(54) THERMALLY ASSISTED MAGNETIC WRITE HEAD SYSTEM UTILIZING MULTILAYER THERMAL BARRIER COATINGS

(75) Inventors: Yongho Ju, San Jose, CA (US); Michael Salo, San Jose, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 97 days.

(21) Appl. No.: 10/460,836

(22) Filed: Jun. 11, 2003

(65) Prior Publication Data

US 2004/0252591 A1 Dec. 16, 2004

(51) Int. Cl.[7] .............................. G11B 11/00; G11B 5/02
(52) U.S. Cl. ........................ 369/13.17; 360/59; 360/126
(58) Field of Search ........................... 369/13.17, 13.56; 360/57, 59, 119–121, 125–126

(56) References Cited

U.S. PATENT DOCUMENTS

| | | | | |
|---|---|---|---|---|
| 6,329,087 B1 | * | 12/2001 | Okamoto | 428/692 |
| 6,493,183 B1 | * | 12/2002 | Kasiraj et al. | 360/126 |
| 6,579,590 B2 | * | 6/2003 | Ju et al. | 428/65.3 |
| 6,614,107 B2 | * | 9/2003 | Inoue et al. | 257/706 |
| 6,636,460 B2 | * | 10/2003 | Akiyama et al. | 369/13.14 |
| 6,731,461 B2 | * | 5/2004 | Yamada et al. | 360/126 |
| 2002/0141294 A1 | | 10/2002 | Chen | 369/13.36 |
| 2002/0191320 A1 | | 12/2002 | Coffey et al. | 360/59 |

FOREIGN PATENT DOCUMENTS

WO 01/91114 11/2001 ............ G11B/5/00

* cited by examiner

*Primary Examiner*—Angel Castro
(74) *Attorney, Agent, or Firm*—Zilka-Kotab, PC

(57) ABSTRACT

A magnetic head system, and method for manufacturing a magnetic head are provided. Included is at least one layer and a heating element positioned adjacent the at least one layer. The at least one layer includes a plurality of sub-layers for providing an optimal thermal barrier.

29 Claims, 7 Drawing Sheets

600

THERMALLY ASSISTED MAGNETIC WRITE HEAD SYSTEM UTILIZING MULTILAYER THERMAL BARRIER COATINGS

FIELD OF THE INVENTION

The present invention relates to magnetic write head structures, and more particularly, this invention relates to heating magnetic pole structures to facilitate writing data to a magnetic storage medium.

BACKGROUND OF THE INVENTION

In a magnetic recording disk drive, data is written by thin film magnetic transducers called "heads", which are supported over a surface of the disk while it is rotated at a high speed. The heads are supported by a thin cushion of air [an "air bearing surface" (ABS)] produced by the disk's high rotational speed. There is a growing trend towards the decreased bit size of magnetic storage disks, making it difficult to write transitions in such magnetic storage mediums.

Prior art FIG. 1 illustrates a partial cross-sectional view of a portion of a head 100 (not drawn to scale), equipped with a heating element to facilitate writing data to a magnetic storage medium. It should be noted that various components of the remaining head 100 are excluded in FIG. 1 for clarity purposes.

As shown, an underlying head structure and substrate 102 are topped with a thick first alumina layer 104 for electrical and thermal insulation purposes Further provided is a thin second alumina layer 108 (for electrical insulation purposes) with a pole layer P1 110 positioned thereon. Situated between the thick first alumina layer 104 and the thin second alumina layer 108 is a heating element 112 surrounded by additional alumina 106. FIG. 2 illustrates an enlarged view of the encircled area shown in FIG. 1, further illustrating the first alumina layer 104, second alumina layer 108 and heating element 112.

By this structure, current may be applied to the heating element 112 which heats inductive write head P1 layer 110 and, indirectly, the magnetic storage medium 120. By heating the magnetic storage medium 120 in such a manner, a coercivity of the magnetic storage medium 120 is improved, making it easier to write, or "flip," the data stored on the magnetic storage medium 120.

In use, the thick first alumina layer 104 works to isolate the remaining portions of the head 100 from the heat generated by the heating element 112. Unfortunately, the thick first alumina layer 104 fails to sufficiently isolate the remaining portions of the head 100, resulting in heat dissipating into the head 100, away from the magnetic storage medium 120 where it is intended.

DISCLOSURE OF THE INVENTION

A magnetic head system, and method for manufacturing a magnetic head are provided. Included is at least one layer and a heating element positioned adjacent the at least one layer. The at least one layer includes a plurality of sub-layers for providing an optimal thermal barrier.

In one embodiment, the plurality of sub-layers include at least one at least partially conductive sub-layer and at least one insulating sub-layer. As an option, the conductive sub-layer may include W, Ta, ZnO, etc. Moreover, the insulating sub-layer may include $Al_2O_3$, $SiO_2$, $Si_3N_4$, $Ta_2O_5$, $SiO_xN_y$, etc. In use, the insulating sub-layer may be positioned adjacent to the heating element.

Optionally, the number of sub-layers may vary. For example, the plurality of sub-layers may include at least three sub-layers, at least four sub-layers, at least five sub-layers, at least six sub-layers, at least eight sub-layers, etc.

In another embodiment, a second layer is also positioned adjacent to the heating element. Such second layer may also include a plurality of sub-layers for providing an optimal thermal barrier, as set forth hereinabove. Thus, a thermal barrier may be positioned above and/or below the heating element. Moreover, the heating element may be positioned anywhere in the head, i.e. above and/or below a pole piece, at an air bearing surface (ABS), etc.

For example, the heating element may be positioned contiguous with an end of the head. Thus, during use, the heating element is capable of transferring an optimal amount of heat directly to an adjacent magnetic storage medium.

In use, the heating element generates heat that may be transferred to an adjacent magnetic storage medium. Moreover, the sub-layers of the at least one layer provides a thermal barrier for preventing heat dissipation from the heating element into another portion(s) of the magnetic head.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior art

Prior art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
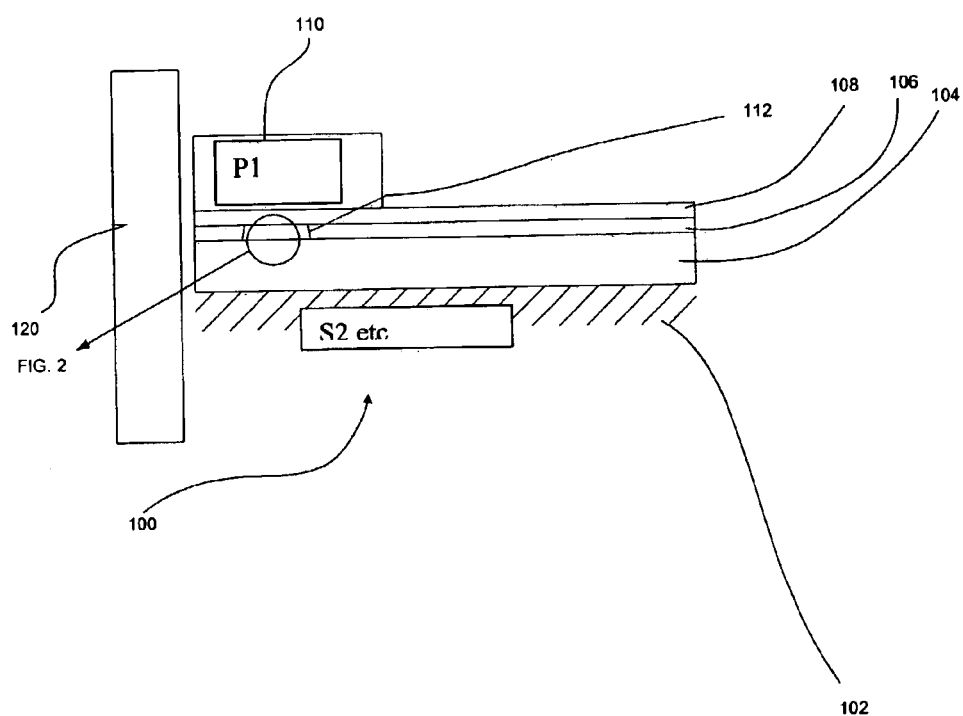
FIG. 1 illustrates a partial cross-sectional view of a portion of a head (not drawn to scale), equipped with a heating element to facilitate writing data to a magnetic storage medium.
Figure 2:
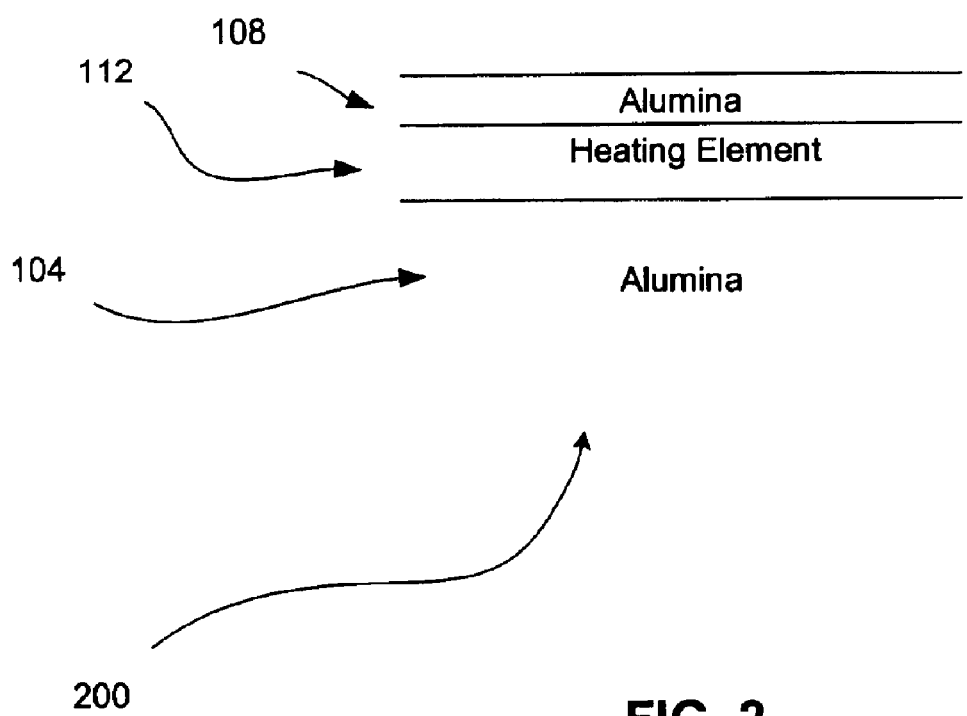
FIG. 2 shows an enlarged view of the encircled area shown in FIG. 1, further illustrating the first alumina layer, second alumina layer and heating element thereof.
Figure 3:
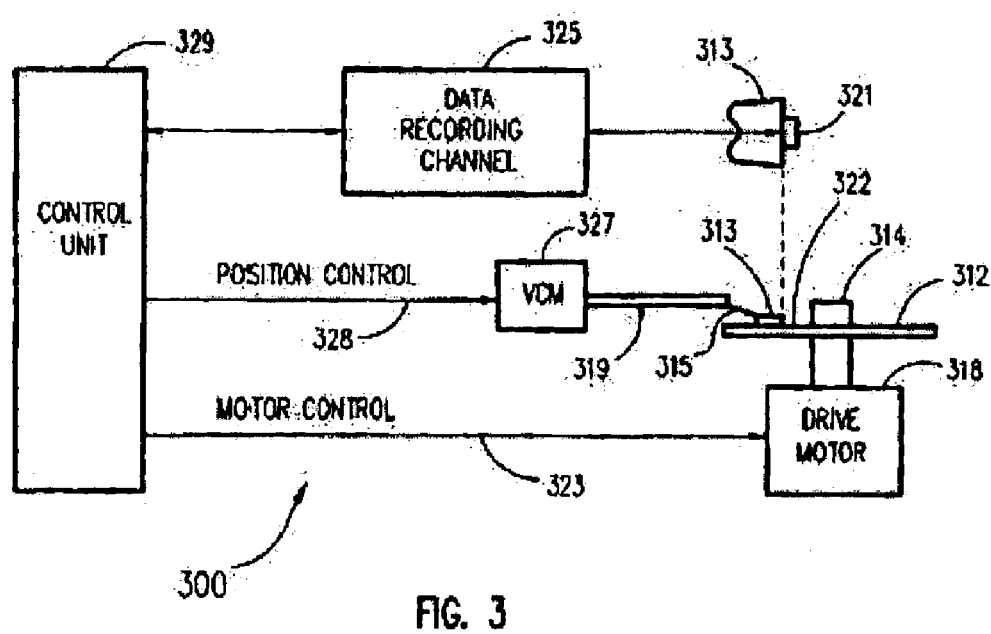
FIG. 3 shows a disk drive embodying one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different portions of the disk where desired data are recorded.

Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor.

The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a magnetic disk storage system, and the accompanying illustration of FIG. 3 are for representation purposes only. It should be apparent that disk storage systems may contain a large number of disks and actuators, and each actuator may support a number of sliders.

Figure 4A:
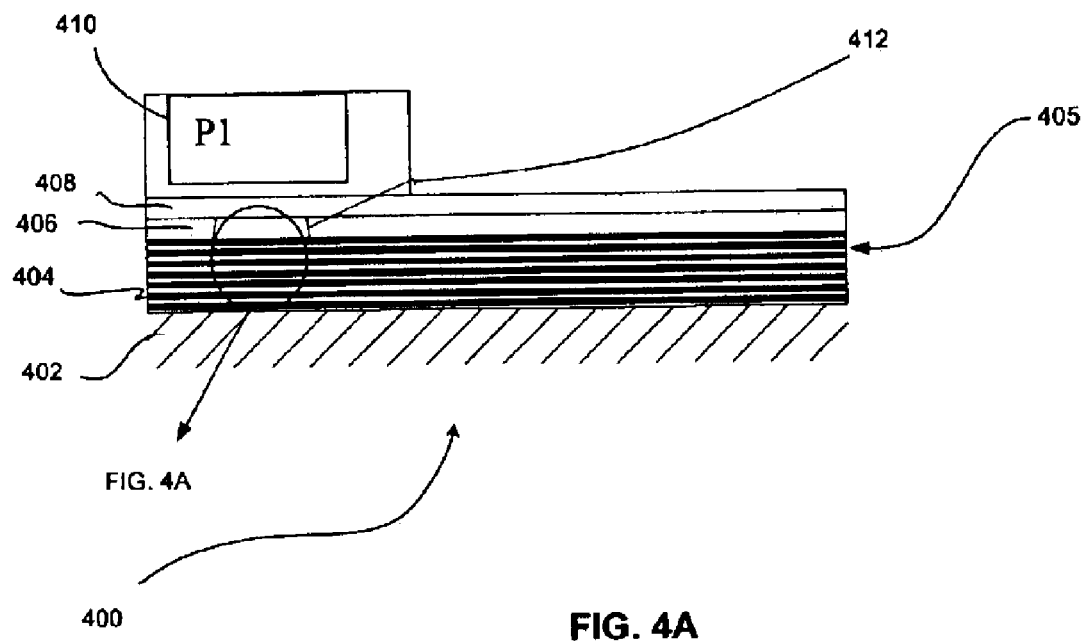
FIG. 4A illustrates a partial cross-sectional view of a portion of a head (not drawn to scale), equipped with a resistive heating element to facilitate writing data to a magnetic storage medium, in accordance with one embodiment.

FIG. 4A illustrates a partial cross-sectional view of a portion of a merged inductive write head/read head 400 (not drawn to scale), equipped with a resistive heating element to facilitate writing data to a magnetic storage medium. It should be noted that various components of the remaining head 400 (i.e. underlying structure, overlying coil, etc.) are excluded in FIG. 4A for clarity purposes. Moreover, it should be noted that the head 400 may be constructed utilizing a giant magnetoresistive (GMR) sensor, magnetoresistive (MR) sensor, tunneling magnetoresistive (TMR) sensor, or any other desired sensor. While such head 400 may be implemented in the context of heads 321 of FIG. 3, it should be noted that the head 400 may further be employed in any desired context.

As shown, included is a first layer 404 and a heating element 412 positioned adjacent the first layer 404. An electrical isolation second layer 408 is also positioned adjacent to the heating element 412. As further shown, the first layer 404 resides below the heating element 412, while the electrical isolation second layer 408 remains above the heating element 412. An intermediate layer 406 may surround the heating element 412, and may or may not be constructed with a material/design similar to that of the first layer 404 and/or the electrical isolation second layer 408. Further provided is a pole tip structure 410 and underlying structure 402, a portion of which is not shown for clarity purposes, as mentioned earlier.

In one embodiment, the first layer 404 includes a plurality of sub-layers 405 for providing a thermal barrier. In use, the heating element 412 generates heat that may be transferred to an adjacent magnetic storage medium. Moreover, the sub-layers 405 of the first layer 404 provide a thermal barrier that is more effective than prior art barriers in preventing heat dissipation from the heating element 412 into another portion(s) of the magnetic head 400.

While one specific configuration is shown in FIG. 4A, it should be noted that a thermal barrier may be positioned above and/or below the heating element 412, as will soon be set forth. Moreover, the heating element 412 may be positioned anywhere in the head, i.e. above and/or below a pole piece, at an air bearing surface (ABS), etc.

Figure 4B:
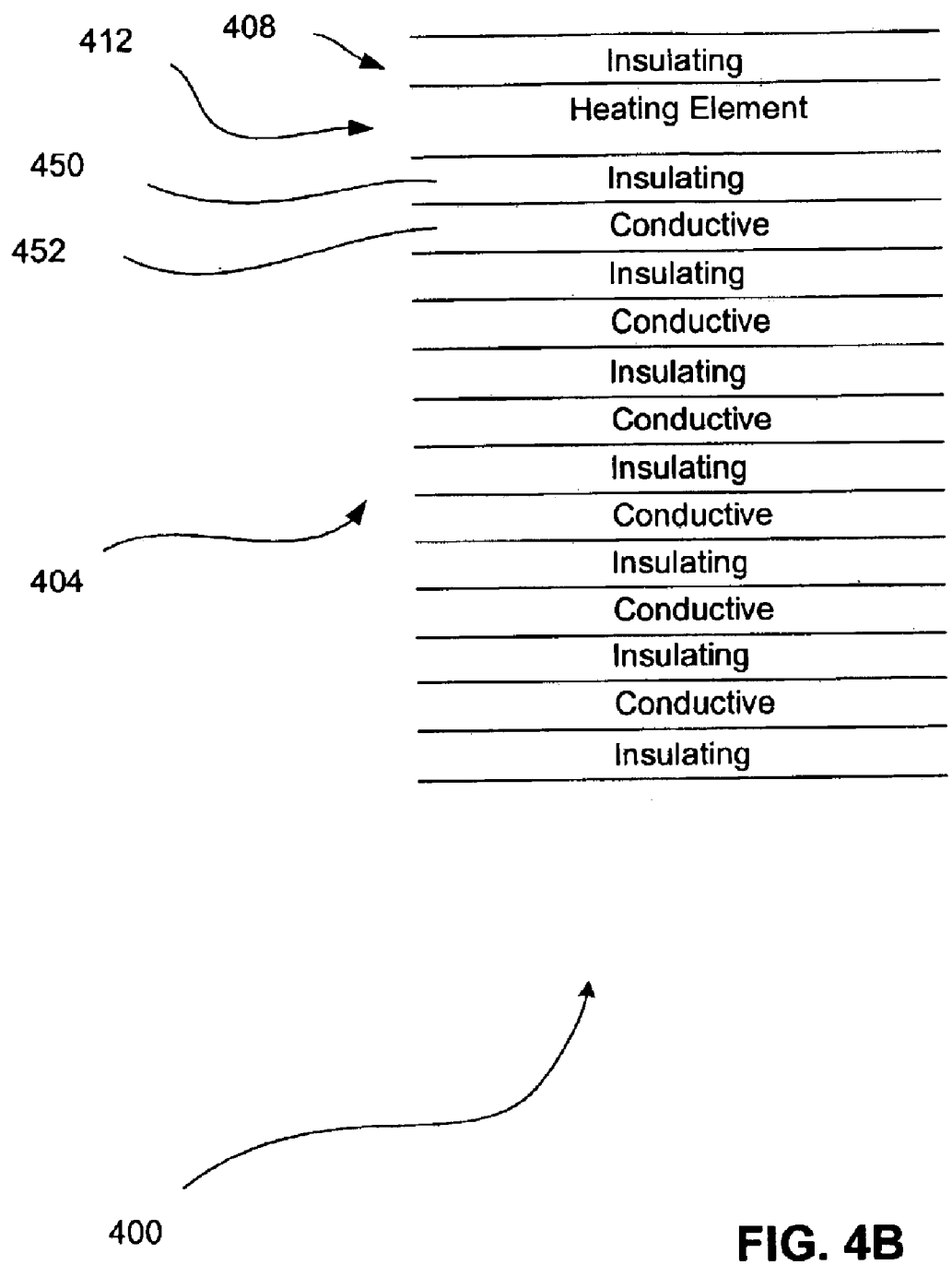
FIG. 4B illustrates a partial cross-sectional view of the encircled portion of the head of FIG. 4A showing the various sub-layers thereof (not drawn to scale), in accordance with one embodiment.

FIG. 4B illustrates a partial cross-sectional view of the encircled portion of the head 400 of FIG. 4A showing the various sub-layers 405 thereof (not drawn to scale), in accordance with one embodiment. While such sub-layers 405 may be implemented in the context of the head 400 of FIG. 4A, it should be noted that the sub-layers 405 may further be employed in any desired head. Moreover, the sub-layers 405 shown are set forth for illustrative purposes, and should not be construed as limiting in any manner.

As shown, the plurality of sub-layers 405 include at least one at least partially conductive (i.e. conducting, semiconducting, etc.) sub-layer 452 and at least one insulating sub-layer 450. As an option, the conductive sub-layer 452 may include Mo, Ni, Cu, W, Ta, ZnO, etc. Moreover, the insulating sub-layer 450 may include $Al_2O_3$, $SiO_2$, $Si_3N_4$, $Ta_2O_5$, $SiO_xN_y$, etc.

To ensure that the heating element 412 is properly electrically insulated, a topmost sub-layer 405 includes an electrically insulating sub-layer 450. For similar reasons, the electrical isolation second layer 408 and the intermediate layer 406 also include an electrically insulating material.

While thirteen sub-layers 405 are shown in FIG. 4B, the number of sub-layers 405 may clearly vary. For example, the plurality of sub-layers 405 may include at least three sub-layers 405, at least four sub-layers 405, at least five sub-layers 405, at least six sub-layers 405, at least eight sub-layers 405, at least ten sub-layers 405, etc.

Moreover, the plurality of sub-layers 405 may include at least three conductive sub-layers 452 and at least three insulating sub-layers 450; at least four conductive sub-layers 452 and at least four insulating sub-layers 450; at least five conductive sub-layers 452 and at least five insulating sub-layers 450; etc. As will soon become apparent, the number of sub-layers 405 may be directly related to the effectiveness of the first layer 404 as a thermal barrier. In operation, the alternating conductive and insulating layering may be layering may be used to exploit the inefficient transport of phonons at the sub-layer barriers.

While the sub-layers 405 may be deposited with any desired thickness, nanolaminates may be used in one embodiment. In any case, thinner layers may be achieved, which exhibit superior thermal barrier qualities.

Of course, the various layers may be deposited in any desired manner. Just by way of example, the depositing may be accomplished using chemical vapor deposition (CVD), sputtering (PVD), reactive sputtering, deposition of metal films and there subsequent oxidation or nitridation ion beam deposition (IBD), spin-on, vacuum processing, etc.

Figure 5:
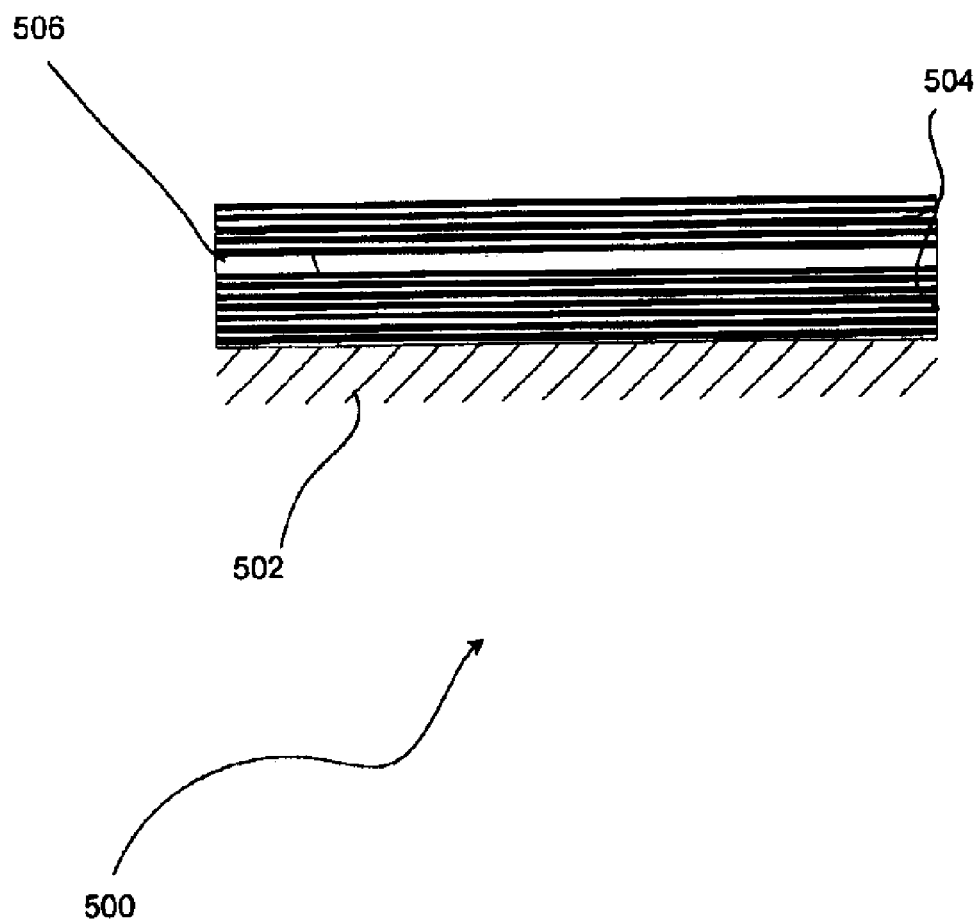
FIG. 5 illustrates a partial cross-sectional view of a portion of a head (not drawn to scale), equipped with dual thermal barriers in accordance with another embodiment.

FIG. 5 illustrates a partial cross-sectional view of a portion of a head 500 (not drawn to scale), equipped with dual thermal barriers in accordance with another embodiment. It should be noted that various components of the remaining head 500 (i.e. underlying structure(s) such as read the read head or pole pieces overlying coil, etc.) are excluded in FIG. 5 for clarity purposes. While such head 500 may be implemented using the various features of the head 400 of FIGS. 4A and 4B and vice-versa, it should be noted that the head 500 may further be employed in any desired context.

As shown, the present head 500 is equipped with two layers 504, each equipped with a plurality of sub-layers. Such embodiment provides an optimal thermal barrier with respect to any overlying portion(s) of the head 500. Similar to the head 400 of FIGS. 4A and 4B, the sub-layers of the dual layers 504 provide a thermal barrier that is more effective than prior art barriers in preventing heat dissipation from a heating element 506 into another portion(s) of the magnetic head 500.

It should be noted that, in another embodiment, only one of the dual layers (i.e. the upper layer) may include the multiple sub-layers. Moreover, the number, configuration, and material make-up of the sub-layers may vary (see, FIG. 4B, for example) per the desires of the user.

As yet another option, the heating element 506 may be positioned contiguous with an end of the head 500. In one embodiment, the heating element 506 may actually be exposed via the end of the head 500, such that only empty space (i.e. air, etc.) resides between the heating element 506 and a magnetic storage medium. Thus, during use, the heating element 506 is capable of transferring an optimal amount of heat to an adjacent magnetic storage medium.

Figure 6:
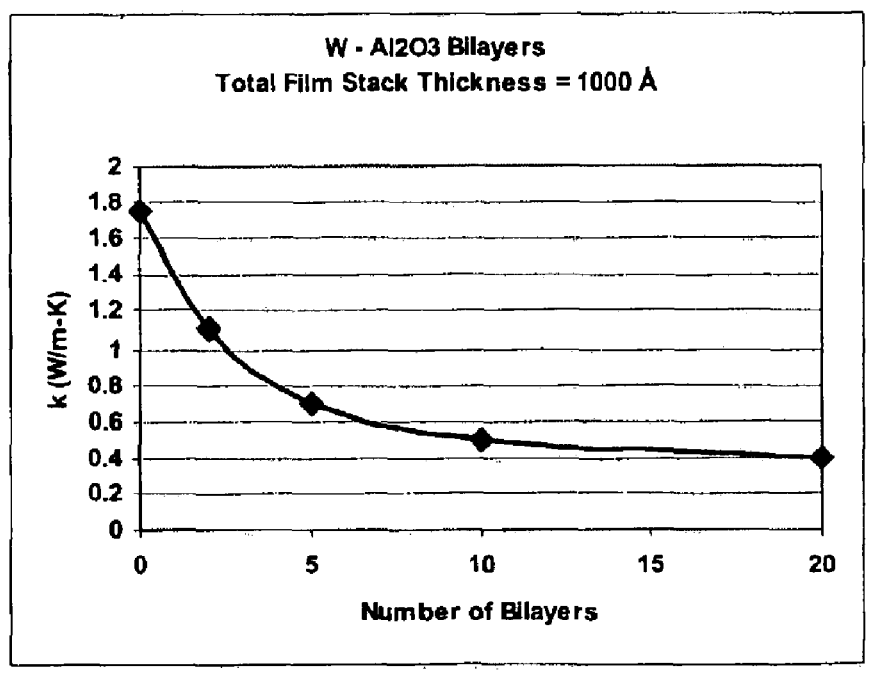
FIG. 6 illustrates one exemplary relationship between the number of sub-layers associated with the magnetic head layers of FIGS. 4A–5, and an effectiveness of such layers as a thermal barrier.

FIG. 6 illustrates one exemplary relationship 600 between the number of sub-layers associated with the magnetic head layers of FIGS. 4A–5, and an effectiveness of such layers as a thermal barrier. Such relationship 600 was provided by a third party (Zechrist et al.) during the course of general research on thermal barriers. As shown, a minimal amount of heat transfer may be achieved with at least ten sub-layers. Of course, any desired thermal insulation may be achieved using the corresponding number of sub-layers.

Moreover, it should be noted that similar heat insulation may be achieved by simulating the multiple sub-layers by using a porous material or any other desired techniques. In any case, such techniques may be capable of achieving the optimal multiple sub-layer thermal insulation in the order of less than 2 (W/m-K).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
at least one layer;
a heating element positioned adjacent the at least one layer, the heating element being present in addition to any sensor or write coil present; and
wherein at least one of the layers includes a plurality of sub-layers for providing thermal insulation.

2. The head as recited in claim 1, wherein the plurality of sub-layers include at least one at least partially conducting conductive sub-layer and at least one insulating sub-layer.

3. The head as recited in claim 2, wherein the at least one insulating sub-layer is positioned adjacent to the heating element.

4. The head as recited in claim 2, wherein the plurality of sub-layers include at least three conductive sub-layers and at least three insulating sub-layers.

5. The head as recited in claim 4, wherein the plurality of sub-layers include at least four conductive sub-layers and at least four insulating sub-layers.

6. The head as recited in claim 5, wherein the plurality of sub-layers include at least five conductive sub-layers and at least five insulating sub-layers.

7. The head as recited in claim 1, wherein the plurality of sub-layers include at least three sub-layers.

8. The head as recited in claim 7, wherein the plurality of sub-layers include at least four sub-layers.

9. The head as recited in claim 8, wherein the plurality of sub-layers include at least five sub-layers.

10. The head as recited in claim 9, wherein the plurality of sub-layers include at least six sub-layers.

11. The head as recited in claim 10, wherein the plurality of sub-layers include at least eight sub-layers.

12. The head as recited in claim 11, wherein the plurality of sub-layers include at least ten sub-layers.

13. The head as recited in claim 1, wherein the heating element generates heat that is transferred to an adjacent magnetic storage medium.

14. A magnetic head, comprising:
at least one layer;
a heating element positioned adjacent the at least one layer; and
wherein the at least one layer includes a plurality of sub-layers for providing thermal insulation,
wherein the conductive sub-layer includes W.

15. The head as recited in claim 14, wherein the insulating sub-layer includes $Al_2O_3$.

16. A magnetic head, comprising:
at least one layer;
a heating element positioned adjacent the at least one layer; and
wherein the at least one layer includes a plurality of sub-layers for providing thermal insulation,
wherein the conductive sub-layer includes Ta.

17. The head as recited in claim 16, wherein the insulating sub-layer includes $Al_2O_3$.

18. A magnetic head, comprising:
at least one layer;
a heating element positioned adjacent the at least one layer; and
wherein the at least one layer includes a plurality of sub-layers for providing thermal insulation,
wherein the conductive sub-layer includes ZnO.

19. The head as recited in claim 18, wherein the insulating sub-layer includes $Al_2O_3$.

20. A method for manufacturing a magnetic head, comprising:
depositing at least one layer; and
depositing a heating element positioned adjacent the at least one layer;
wherein at least one of the layers includes a plurality of sub-layers positioned adjacent one another for providing thermal insulation, wherein the heating element is formed in addition to any sensor or write coil present in the magnetic head.

21. The method as recited in claim 20, wherein the plurality of sub-layers include at least one at least partially conductive sub-layer and at least one insulating sub-layer.

22. A method for manufacturing a magnetic head, comprising:

depositing at least one layer; and depositing a heating element positioned adjacent the at least one layer;

wherein the at least one layer includes a plurality of sub-layers for providing thermal insulation, wherein the plurality of sub-layers include at least one at least partially conductive sub-layer and at least one insulating sub-layer, wherein the conductive sub-layer includes W.

23. The method as recited in claim 22, wherein the insulating sub-layer includes $Al_2O_3$.

24. A method for manufacturing a magnetic head, comprising:

depositing at least one layer; and depositing a heating element positioned adjacent the at least one layer;

wherein the at least one layer includes a plurality of sub-layers for providing thermal insulation, wherein the plurality of sub-layers include at least one at least partially conductive sub-layer and at least one insulating sub-layer, wherein the conductive sub-layer includes Ta.

25. The method as recited in claim 24, wherein the insulating sub-layer includes $Al_2O_3$.

26. A method for manufacturing a magnetic head, comprising:

depositing at least one layer; and depositing a heating element positioned adjacent the at least one layer;

wherein the at least one layer includes a plurality of sub-layers for providing thermal insulation, wherein the plurality of sub-layers include at least one at least partially conductive sub-layer and at least one insulating sub-layer, wherein the conductive sub-layer includes ZnO.

27. A magnetic head, comprising:

a thermally insulating layer; and a heating element positioned adjacent the layer;

wherein the layer exhibits less than 0.8 (W/m-K) of heat transfer.

28. A magnetic head, comprising:

a heating element positioned contiguous with an end of the head to transfer an optimal amount of heat to an adjacent magnetic storage medium during use, wherein the heating element is positioned towards a pole piece of the head but not between a write gap of the head.

29. A disk drive system, comprising:

a magnetic recording disk;

a magnetic head including:
 at least one layer, and
 a heating element positioned adjacent the at least one layer, the heating element being present in addition to any sensor or write coil in the magnetic head,
 wherein the at least one layer includes a plurality of sub-layers for providing thermal insulation;

an actuator for moving the magnetic head across the magnetic recording disk so the magnetic head may access different regions of the magnetic recording disk; and a controller electrically coupled to the magnetic head.

* * * * *